(No Model.)
W. H. & C. ROEHR.
BICYCLE RIM.
No. 541,119.
Patented June 18, 1895.
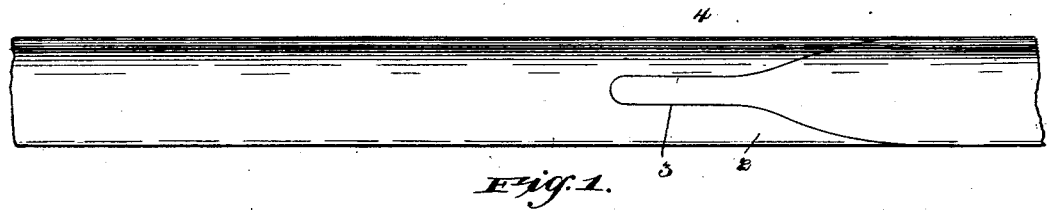
Fig. 1.
Fig. 2.
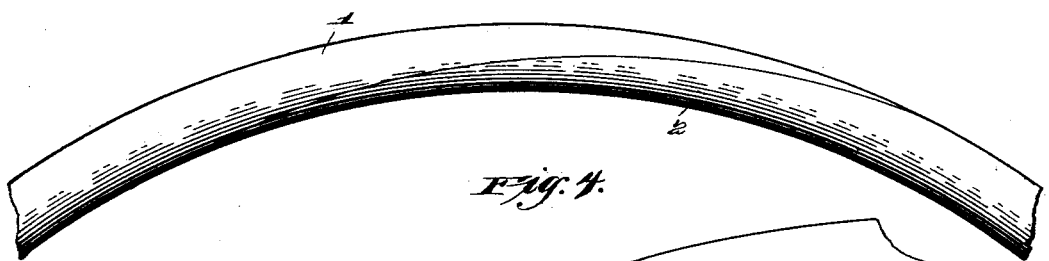
Fig. 4.
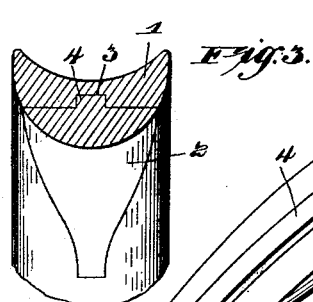
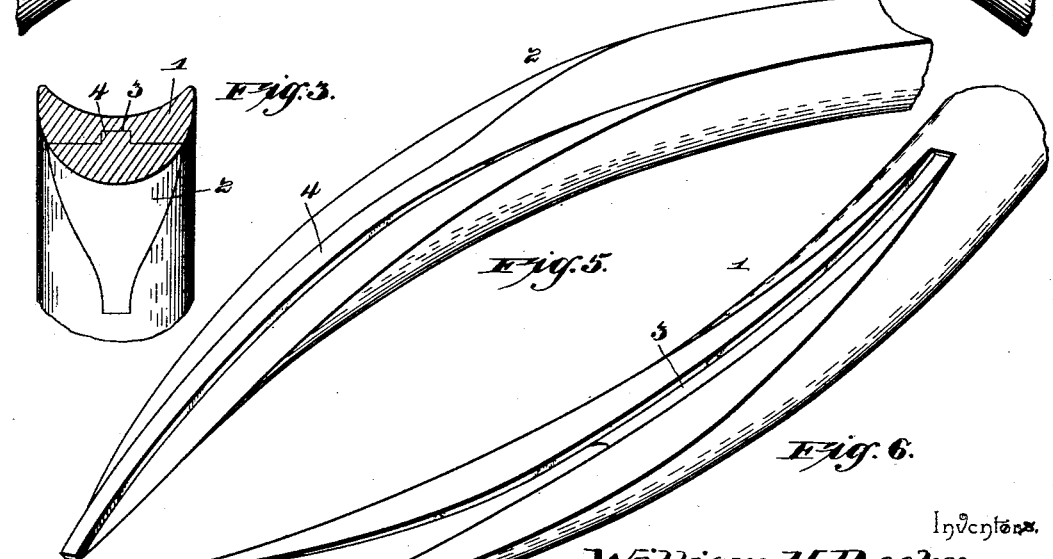
Fig. 3.
Fig. 5.
Fig. 6.
Witnesses
W. F. Doyle
J. F. Riley
Inventors
William H. Roehr, and
Charles Roehr.
By their Attorneys
C. A. Snow & Co.

UNITED STATES PATENT OFFICE.

WILLIAM H. ROEHR AND CHARLES ROEHR, OF BUCYRUS, OHIO.

BICYCLE-RIM.

SPECIFICATION forming part of Letters Patent No. 541,119, dated June 18, 1895.

Application filed October 29, 1894. Serial No. 527,311. (No model.)

*To all whom it may concern:*

Be it known that we, WILLIAM H. ROEHR and CHARLES ROEHR, citizens of the United States, residing at Bucyrus, in the county of Crawford and State of Ohio, have invented a new and useful Bicycle-Rim, of which the following is a specification.

The invention relates to improvements in bicycle rims.

The object of the present invention is to improve the construction of wooden bicycle-rims, and to provide a simple and effective joint, which will contribute the necessary strength and durability to the wheel.

The invention consists in the construction and novel combination and arrangement of parts hereinafter fully described, illustrated in the accompanying drawings, and pointed out in the claim hereto appended.

In the drawings, Figure 1 is a plan view of the outer or grooved side of a portion of a rim for bicycle-wheels constructed in accordance with this invention. Fig. 2 is a similar view of the inner side of the same. Fig. 3 is a transverse sectional view. Fig. 4 is a side view. Fig. 5 is a detail perspective view of one of the overlapping ends or portions of the joint. Fig. 6 is a similar view of the other overlapping end or portion.

Like numerals of reference indicate corresponding parts in all the figures of the drawings.

1 and 2 designate overlapping ends or portions of a wooden bicycle rim or felly. The sections or ends 1 and 2 are curved longitudinally, and are provided with concave or grooved outer faces, and are split or cut at a long bevel, to provide a considerable overlapping portion; and the beveled faces of the ends 1 and 2, are secured by a suitable glue or adhesive mixture, or by other suitable means.

The outer portion 1 of the joint is provided in its inner face with a longitudinal groove 3, extending the entire length of the beveled or tapered portion; and the inner portion 2 of the joint is provided with a corresponding longitudinal tongue 4, which fits snugly in the groove 3 of the outer portion 1 of the joint. The longitudinal tongue and groove connection securely locks the tapered or beveled ends or portions of the joint against lateral movement or separation.

The groove 3 forms a tapering or diverging bifurcation at the outer end of the section 1, which terminates in two points; and the rib or tongue 4 is enlarged at its inner terminus to correspond to the configuration of the section 1.

The outer face of the rim is grooved in the usual manner for the reception of a bicycle tire.

It will be seen that a simple and inexpensive joint is provided, and that the joint possesses great strength and durability, and that the rim is not materially weakened at the joint.

Changes in the form, proportion, and the minor details of construction may be resorted to without departing from the principle or sacrificing any of the advantages of this invention.

What we claim is—

The herein shown and described joint for wooden bicycle rims, comprising two sections 1 and 2 which have their contiguous portions beveled and overlapping, the section 2 being convexed between its edges on the inner side and having a longitudinal rib 4 on its beveled portion which gradually widens and tapers to the plane of the outer surface of the said section, and the section 1 being concaved and having a longitudinal groove 3 which extends through the concaved surface a distance from the extremity of the said section, and which has the tapering portions forward of the groove 3 flaring outwardly on their inner edges to conform to the widening portion of the rib 4, substantially as described for the purpose set forth.

In testimony that we claim the foregoing as our own we have hereto affixed our signatures in the presence of two witnesses.

WILLIAM H. ROEHR.
           CHARLES ROEHR.

Witnesses:
  A. J. SCHACK,
  A. J. FLAHARTY.